United States Patent
Peraza et al.

(10) Patent No.: US 8,627,274 B2
(45) Date of Patent: Jan. 7, 2014

(54) SOFTWARE TOOL AND METHOD FOR GENERATING A VIRTUAL APPLIANCE

(75) Inventors: David Peraza, Miami, FL (US); Hypatia Rojas, Round Rock, TX (US); Frank Schwichtenberg, Natick, MA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/084,034

(22) Filed: Apr. 11, 2011

(65) Prior Publication Data

US 2012/0260229 A1 Oct. 11, 2012

(51) Int. Cl.
*G06F 9/44* (2006.01)

(52) U.S. Cl.
USPC .......................................... 717/104; 717/105

(58) Field of Classification Search
None
See application file for complete search history.

(56) References Cited

U.S. PATENT DOCUMENTS

| | | | | |
|---|---|---|---|---|
| 6,415,023 B2 * | 7/2002 | Iggulden | ................ | 379/102.03 |
| 6,882,712 B1 * | 4/2005 | Iggulden et al. | ......... | 379/102.03 |
| 7,257,804 B2 * | 8/2007 | Baecker et al. | ................ | 717/124 |
| 8,074,218 B2 * | 12/2011 | Eilam et al. | ........................ | 718/1 |
| 8,209,288 B2 * | 6/2012 | Friedman et al. | ............. | 707/638 |
| 8,245,222 B2 * | 8/2012 | Chalupa et al. | ................ | 717/174 |
| 8,250,215 B2 * | 8/2012 | Stienhans et al. | ............. | 709/227 |
| 8,281,307 B2 * | 10/2012 | Arnold et al. | ...................... | 718/1 |
| 8,495,512 B1 * | 7/2013 | Lappas et al. | ................. | 715/764 |
| 2004/0205691 A1 * | 10/2004 | Poole et al. | .................... | 717/100 |
| 2006/0230314 A1 * | 10/2006 | Sanjar et al. | ..................... | 714/26 |
| 2007/0011650 A1 * | 1/2007 | Hage et al. | .................... | 717/104 |
| 2007/0055972 A1 * | 3/2007 | Brown et al. | .................. | 717/174 |
| 2007/0078988 A1 * | 4/2007 | Miloushev et al. | ........... | 709/227 |
| 2008/0163194 A1 * | 7/2008 | Dias et al. | ....................... | 717/174 |
| 2009/0217244 A1 | 8/2009 | Bozak et al. | | |
| 2009/0217263 A1 * | 8/2009 | Gebhart et al. | .................... | 718/1 |
| 2009/0249279 A1 * | 10/2009 | Bourdon | ....................... | 717/101 |
| 2009/0249284 A1 * | 10/2009 | Antosz et al. | ................. | 717/104 |
| 2009/0249287 A1 * | 10/2009 | Patrick | .......................... | 717/107 |
| 2009/0300151 A1 * | 12/2009 | Friedman et al. | ............. | 709/222 |
| 2009/0300604 A1 * | 12/2009 | Barringer | ...................... | 717/178 |
| 2009/0300641 A1 * | 12/2009 | Friedman et al. | ............. | 718/104 |
| 2010/0257523 A1 * | 10/2010 | Frank | ............................... | 718/1 |
| 2011/0126207 A1 * | 5/2011 | Wipfel et al. | ................. | 718/104 |
| 2011/0154441 A1 * | 6/2011 | Oh et al. | ........................... | 726/3 |

OTHER PUBLICATIONS

VMware Studio, http://www.vmware.com/appliances/getting-started/learn/vmware_studio.html, Mar. 15, 2011.
Virtual Appliance Marketplace, http://www.vmware.com/appliances/directory/, Mar. 15, 2011.

* cited by examiner

*Primary Examiner* — Don Wong
*Assistant Examiner* — Daxin Wu
(74) *Attorney, Agent, or Firm* — Martin & Associates LLC; Derek P. Martin

(57) ABSTRACT

A virtual appliance construction tool allows a user to select using a user interface functional information for a virtual appliance to generate a functional model of the virtual appliance. A knowledge base of configuration units is then queried to determine which configuration units are needed to satisfy the functional model. Note the configuration units include not only functional information, but virtualization information as well. The configuration units are then packaged into a virtual appliance blueprint, which is used to generate a certified virtual appliance. In this manner the user need not have extensive knowledge or training regarding virtualization because the virtualization information is selected automatically based on which configuration units provide the function specified by the user.

13 Claims, 4 Drawing Sheets

SOFTWARE TOOL AND METHOD FOR GENERATING A VIRTUAL APPLIANCE

BACKGROUND

1. Technical Field

This disclosure generally relates to computer systems, and more specifically relates to the generation of a virtual appliance such as an open virtualization appliance (OVA) that may be deployed in a cloud computing environment.

2. Background Art

Cloud computing has become an area of emphasis for software and website providers. Cloud computing is a general term for presenting computation, software, data access, and storage services in a manner that the end-user has no knowledge of the physical location and configuration of the system that delivers the services. Cloud computing relies heavily on virtualized resources. Thus, for software to be deployed in a cloud computing environment, the software is generally described as running on one or more virtual servers. When the user executes the software, the user has no idea the location or number of physical servers that deliver the virtualized software.

The term "virtual appliance" has been used to describe a virtual software image designed to run on a virtualization platform. A typical virtual appliance includes a group of master disk images and metadata describing the virtual systems needed to boot and run the software stack stored in the disk images. A virtual appliance is usually constructed to host a single software application. A virtual appliance thus represents a new way of deploying network software applications. The disk images and metadata describing the virtual appliance may be provided in Open Virtualization Format (OVF). OVF is an open standard for packaging and distributing virtual appliances to be run by a hypervisor. An OVF package generally consists of several files (virtual systems disk images and an OVF file describing the virtual system) placed in one directory. The OVF package may be compressed as a single file known as an Open Virtualization Appliance (OVA).

Known methods for constructing a virtual appliance required a user to provide or specify both the functional information as well as the virtualization information to create the virtual appliance. This requires the user to have substantial expertise not only in the software application, but in virtualization as well. The prior art provides no way for a user with functional expertise for software to construct a virtual appliance without also having the virtualization expertise. As a result, the only users who currently create virtual appliances are those who have detailed expertise and knowledge regarding both the software to be deployed and virtualization. This greatly limits the people who can construct virtual appliances.

BRIEF SUMMARY

A virtual appliance construction tool includes a user interface that allows a user to select functional features in the user interface that determine functional requirements for a virtual appliance. The functional features presented in the user interface are limited by the functional features available in a knowledge base of configuration units. Each configuration unit includes both functional information and virtualization information. The user selects functional features in the user interface, which defines a functional model. The knowledge base of configuration units is then queried to retrieve all configuration units that correspond to the functional features in the functional model that were selected by the user in the user interface. The configuration units are then packaged into a virtual appliance blueprint that may be used to generate the virtual appliance. Note the blueprint includes both the functional information and the virtualization information in each selected configuration unit, but the user only had to select the functional features in the user interface. In this manner a user with little experience in virtualization may create a virtual appliance using the virtual appliance construction tool. This greatly expands the number of users who can create virtual appliances.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 5:
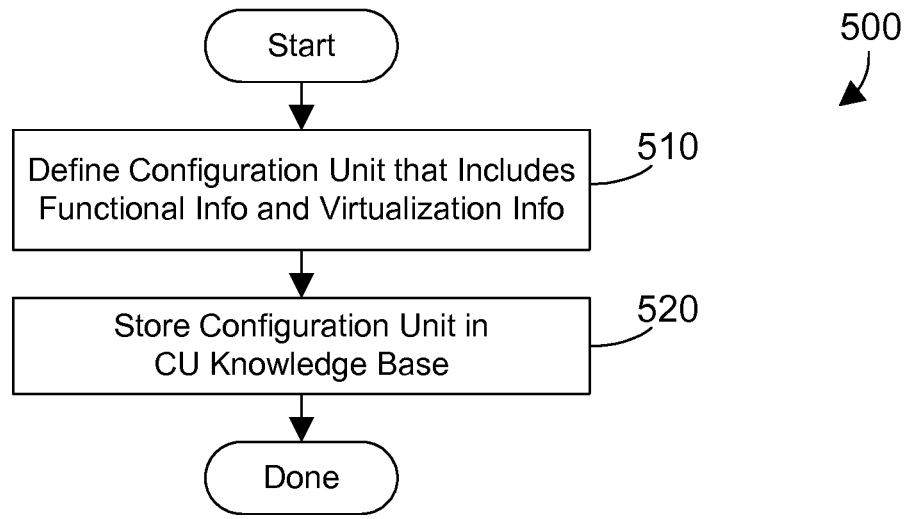
Figure 6:
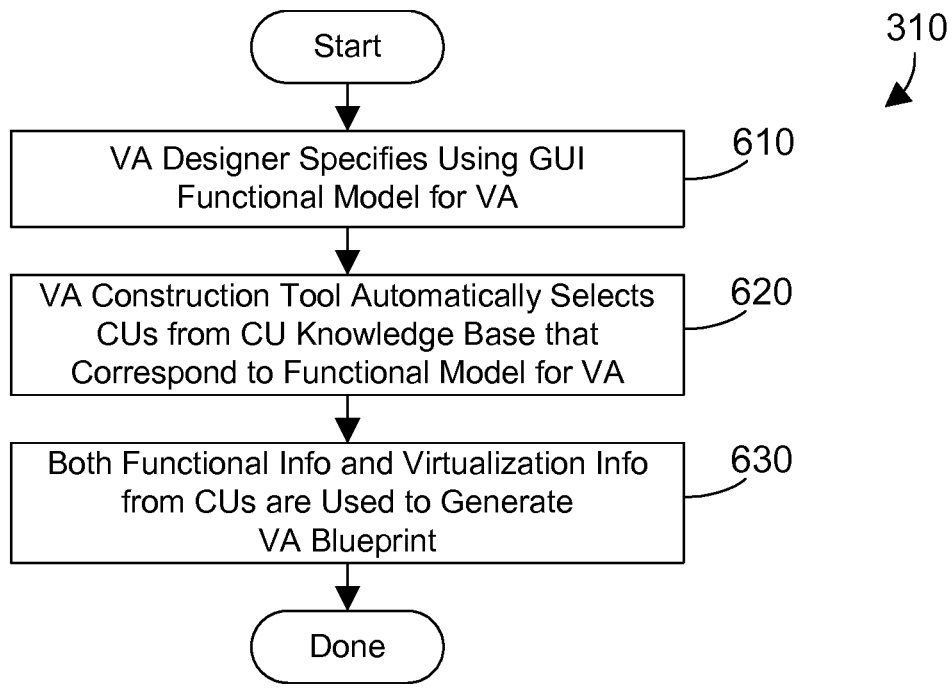

FIG. 5 is a flow diagram of a method to define both functional information and virtualization information for software in a configuration unit that is stored in a knowledge base; and FIG. 6 is a flow diagram of a method for generating a VA blueprint that includes both functional information and virtualization information based on a user's selection of only functional information in the graphical user interface (GUI).

DETAILED DESCRIPTION

The claims and disclosure herein provide a virtual appliance construction tool that allows a user to select using a user interface functional information for a virtual appliance to generate a functional model of the virtual appliance. A knowledge base of configuration units is then queried to determine which configuration units are needed to satisfy the functional model. Note the configuration units include not only functional information, but virtualization information as well. The configuration units are then packaged into a virtual appliance blueprint, which is used to generate the certified virtual appliance. In this manner the user need not have extensive knowledge or training regarding virtualization information because the virtualization information is selected automatically based on which configuration units provide the function specified by the user.

Figure 1:
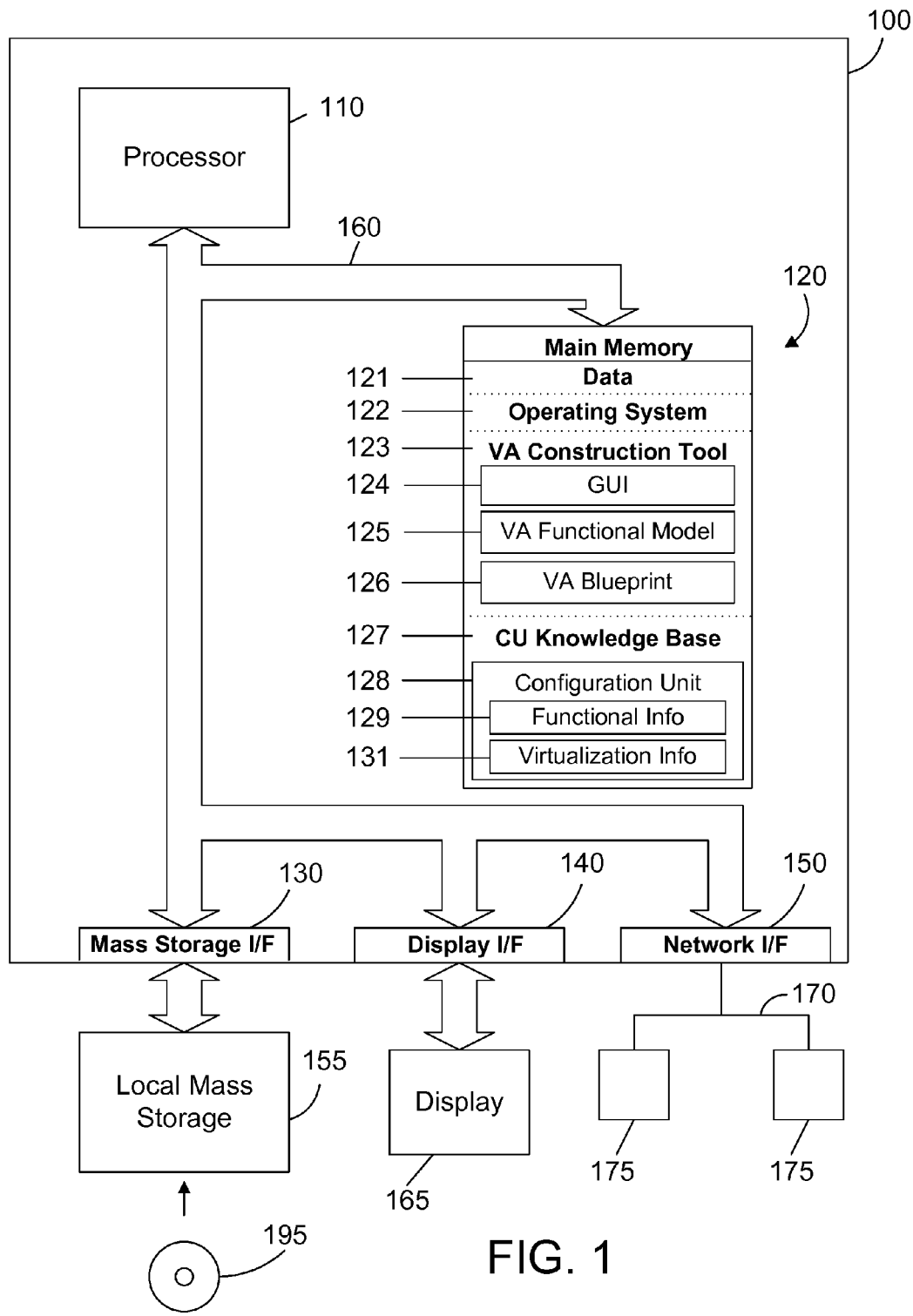
FIG. 1 is a block diagram of an apparatus that includes a virtual appliance (VA) construction tool that is used to construct a VA blueprint that includes both functional information and virtualization information without requiring a user to select or specify virtualization information.

Referring to FIG. 1, a computer system 100 is one suitable implementation of a computer system that includes a virtual appliance construction tool. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a virtual appliance (VA) construction tool 123, and a configuration unit (CU) knowledge base 127. Data 121 represents any data that serves as input to or output from any program in computer system 100. Operating system 122 is a multitasking operating system. VA construction tool 123 is a software tool that is used to generate a VA blueprint 126. The VA construction tool 123 includes a graphical user interface (GUI) 124 that allows a user to select or otherwise specify functional information for a virtual appliance. In the most preferred implementation, the GUI only presents to the user functional information that is present in the configuration unit (CU) knowledge base 127, thereby constraining the user's selection to functions that are in the CU knowledge base 127. The user's selections of functional information form a VA functional model 125, which includes all the functional information selected by the user for the virtual appliance. The VA functional model is then used to query the CU knowledge base 127. Note the CU knowledge base 127 includes multiple configuration units 128 that each includes functional information 129 and virtualization information 131. The VA construction tool 123 determines which configuration units in the CU knowledge base 127 correspond to the functions specified by the user in the GUI, retrieves the corresponding CUs, and creates a virtual appliance blueprint 126 that includes the corresponding CUs. Note the VA blueprint 126 includes the applicable CUs, which include both functional information and virtualization information. In this manner, a user may select only functional information in the GUI, and the VA construction tool 123 will generate from the user's selection a VA blueprint 126 that includes both functional information and virtualization information, without the user having to specify any virtualization information. Because no virtualization expertise is needed to select functional information, the VA construction tool 123 expands the number of users who can generate virtual appliances to any user who can specify the functional requirements for the virtual appliance.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, VA construction tool 123, and CU knowledge base 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the VA construction tool 123.

Although computer system 100 is shown to contain only a single processor and a single system bus, those skilled in the art will appreciate that a virtual appliance construction tool may be practiced using a computer system that has multiple processors and/or multiple buses. In addition, the interfaces that are used preferably each includes separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
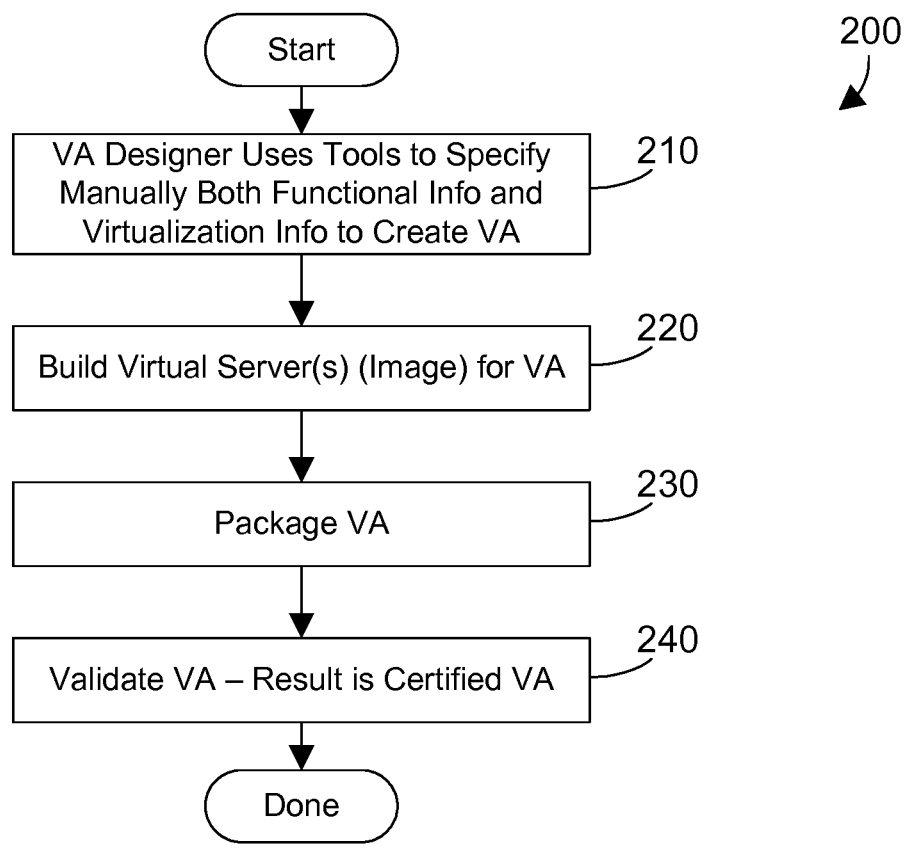
FIG. 2 is a flow diagram of a prior art method for manually generating a certified virtual appliance.

Referring to FIG. 2, a prior art method 200 for generating a virtual appliance begins by the virtual appliance (VA) designer (user) using known physical-to-virtual software tools to specify manually both the functional information and virtualization information to create a virtual appliance (step 210). One or more virtual servers are then built for the virtual appliance (step 220). Note the virtual servers comprise what is termed an "image" for the virtual appliance. The virtual appliance is then packaged (step 230), and validated (step 240). The end result is a certified virtual appliance that is ready to be deployed.

As alluded to above in the Background Art section, the existing physical-to-virtual tools used by the VA designer in step 210 require substantial expertise on the part of the VA designer to create the virtual appliance. While FIG. 2 relates to generation of a virtual appliance from scratch, there are also other known methods for generating a virtual appliance, such as capturing a running workload using virtual-to-virtual tools. All of the known methods for generating a virtual appliance suffer from the same problem, namely, the user building the virtual appliance must have extensive knowledge and expertise relating to the function of the software, as well as expertise relating to virtualization of the software. The disclosure and claims provide a software tool that allows a user that is relatively unfamiliar with virtualization to generate a virtual appliance that includes the needed virtualization information by simply specifying the functional information for the virtual appliance, as discussed in detail below.

Figure 3:
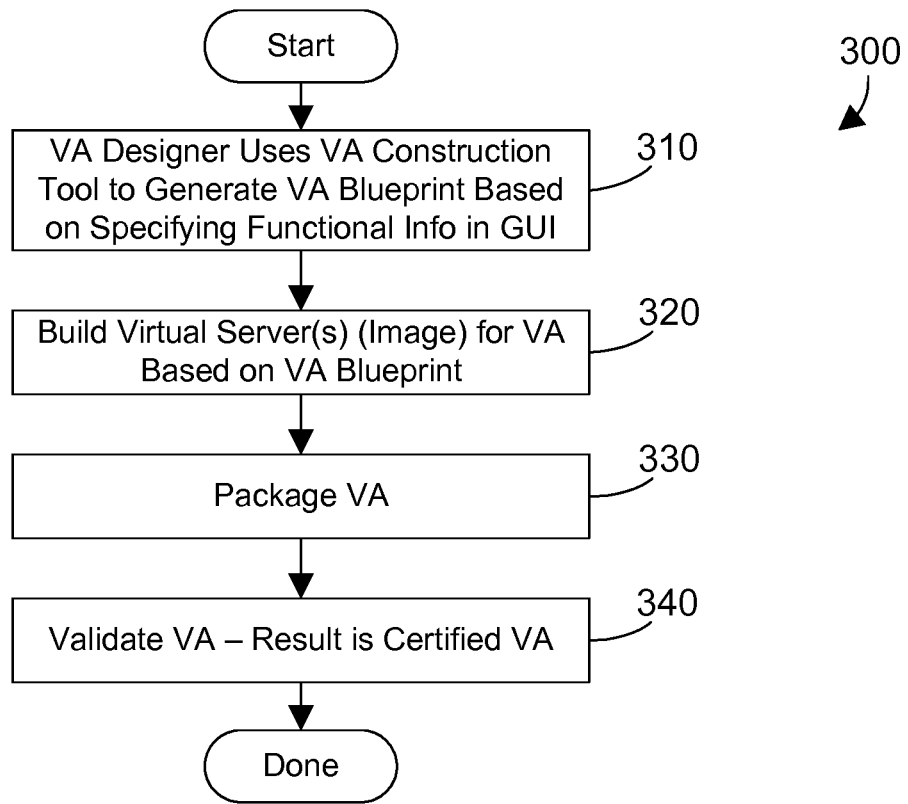
FIG. 3 is a flow diagram of a method for generating a certified VA using a VA construction tool.

Referring to FIG. 3, a method 300 allows a user to generate a certified virtual appliance without explicitly specifying any virtualization information for the virtual appliance. The VA designer uses the VA construction tool (123 in FIG. 1) to generate a VA blueprint (126 in FIG. 1) based on selecting or otherwise specifying functional information in the GUI (step 310). The virtual servers (image) are then built for the virtual appliance based on the virtual appliance blueprint (step 320). The virtual appliance is then packaged (step 330) and validated (step 340). The result is a certified virtual appliance. Note, however, the virtual appliance was built without the VA designer explicitly specifying any virtualization information in step 310, as described below with reference to FIGS. 5 and 6.

Figure 4:
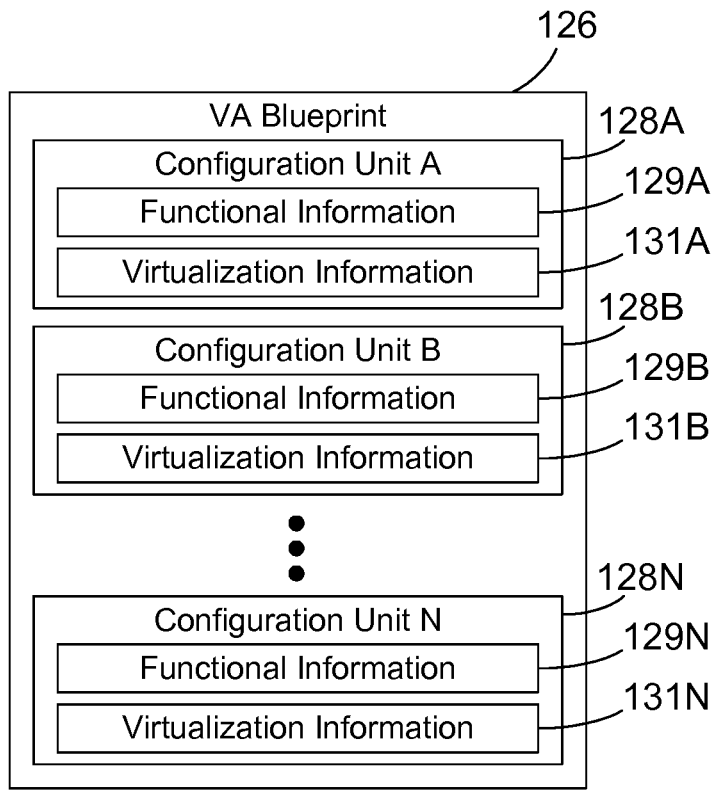
FIG. 4 is a block diagram showing one suitable representation of a VA blueprint.

One suitable implementation is shown in FIG. 4 for the virtual appliance blueprint 126 shown in FIG. 1. The virtual appliance blueprint 126 preferably includes a plurality of configuration units 128 shown in FIG. 1. For the specific example shown in FIG. 4, we assume the VA blueprint 126 includes N configuration units, shown in FIG. 4 as configuration unit A, configuration unit B, . . . , configuration unit N. Each configuration unit includes corresponding functional information and virtualization information. Thus, configuration unit A 128A includes functional information 129A and virtualization information 131A; configuration unit B 128B includes functional information 129B and virtualization information 131B; through configuration unit N 128N that includes functional information 129N and virtualization information 131N. The VA blueprint 126 is constructed based on the VA designer's selection of functional information in the GUI, but because the virtualization information is included with the functional information in each configuration unit, all information needed to create the virtual appliance is present in the VA blueprint 126.

The VA construction tool and methods disclosed herein require a knowledge base of configuration units that each includes functional information and virtualization information. Referring to FIG. 5, a configuration unit (CU) is defined that includes functional information and virtualization information (step 510). The configuration unit is then stored in the CU knowledge base (step 520). Step 510 in FIG. 5 is preferably performed by the provider of the software. Thus, both the functional information and the virtualization information can be provided by an expert who has sufficient information to generate the configuration unit. While this expert is preferably someone who works for the company providing the software, this expert could also be a third party person who has sufficient expertise to define the configuration unit.

As used herein, the term "functional information" includes any information that describes function of a software application within the virtual appliance. Examples of suitable functional information include the name of the software, the software vendor, the software version, compatible operating systems, other software dependencies, etc. As used herein, the term "virtualization information" includes any information relating to virtualization of the software application within the virtual appliance, which may include metadata that describes how to package the software application within the virtual appliance. Examples of suitable virtualization information include software activation properties in a virtual machine, hypervisor, disk format, drivers supported by the virtualization layer, interrelationships between virtual machines (for the case of a multi-virtual machine virtual appliance), reference to the activation engine program that will run on a host virtual machine, open virtual format transport type, etc.

The CU knowledge base 127 shown in FIG. 1 could be a local database, could be a remote database, or could be any suitable collection of data stored in any suitable manner or location. In one specific implementation, the CU knowledge base could include a collection of databases publicly accessible via the Internet. Thus, each software vendor could provide its own CU knowledge base for its own products. In the alternative, several knowledge bases could exist that each includes different configuration units. If this is the case, different knowledge bases could be interrogated to select and retrieve configuration units for a given virtual appliance.

One suitable implementation for step 310 in FIG. 3 is shown as method 310 in FIG. 6. The VA designer specifies using the GUI a functional model for the virtual appliance (step 610). In the most preferred implementation, the selections available to the VA designer are constrained by the configuration units available in the CU knowledge base to assure a virtual appliance blueprint can be generated from existing configuration units. In an alternative implementation, the VA designer may specify functions that are not included in any existing configuration unit, which would then require the VA designer or someone else define a new configuration unit for the specified functions. Because a goal of the VA construction tool 123 is to allow defining a virtual appliance without requiring extensive knowledge of virtualization, the preferred implementation limits the choices in the GUI to the functions provided by the configuration units in the CU knowledge base. The VA construction tool automatically selects configuration units from the CU knowledge base that correspond to the functional model for the virtual appliance (step 620). Both the functional information and the virtualization information for the configuration units selected in step 620 are then retrieved to generate the virtual appliance blueprint (step 630). At this point, step 310 in FIG. 3 is complete, and steps 320, 330 and 340 may be performed as described above to generate a certified virtual appliance that is ready to be deployed. In the most preferred implementation, the virtual appliance is an Open Virtualization Appliance (OVA).

The disclosure and claims are directed to a virtual appliance construction tool that allows a user to select using a GUI functional information for a virtual appliance to generate a functional model of the virtual appliance. A knowledge base of configuration units is then queried to determine which configuration units are needed to satisfy the functional model. Note the configuration units include not only functional information, but virtualization information as well. The configuration units are then packaged into a virtual appliance blueprint, which is used to generate a certified virtual appliance. In this manner the user need not have extensive knowledge or training regarding virtualization because the virtualization information is selected automatically based on which configuration units provide the function specified by the user.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a knowledge base residing in the memory, the knowledge base comprising a plurality of configuration units, each configuration unit including functional information and corresponding virtualization information, wherein the functional information specifies software function and the corresponding virtualization information specifies metadata that describes how to package the software function within a virtual appliance; and
a virtual appliance construction tool residing in the memory and executed by the at least one processor, the virtual appliance construction tool providing a user interface that allows a user to specify functional information in the user interface corresponding to the functional information stored in the plurality of configuration units in the knowledge base, wherein the user specifies the functional information in the user interface and does not select or otherwise specify in the user interface the corresponding virtualization information, the virtual appliance construction tool generating from the user-specified functional information in the user interface a virtual appliance functional model, querying the knowledge base to determine which configuration units have functional information that corresponds to the virtual appliance functional model without regard to the corresponding virtualization information, retrieving from the knowledge base both the functional information and the corresponding virtualization information for the configuration units that correspond to the virtual appliance functional model, and generating a virtual appliance blueprint that includes the configuration units that correspond to the virtual appliance functional model.

2. The apparatus of claim 1 wherein a certified virtual appliance is generated from the virtual appliance blueprint.

3. The apparatus of claim 1 wherein the virtual appliance is an open virtualization appliance (OVA).

4. The apparatus of claim 1 wherein the user specifies the functional information in the user interface by making a plurality of selections in the user interface.

5. A computer-implemented method executed by at least one processor for generating a virtual appliance, the method comprising the steps of:
 providing a knowledge base comprising a plurality of configuration units, each configuration unit including functional information and corresponding virtualization information, wherein the functional information specifies software function and the corresponding virtualization information specifies metadata that describes how to package the software function within a virtual appliance;
 providing a virtual appliance construction tool that performs the steps of:
  providing a user interface that allows a user to specify functional information in the user interface corresponding to the functional information stored in the plurality of configuration units in the knowledge base, wherein the user specifies the functional information in the user interface and does not select or otherwise specify in the user interface the corresponding virtualization information;
  generating from the user-specified functional information in the user interface a virtual appliance functional model;
  querying the knowledge base to determine which configuration units have functional information that corresponds to the virtual appliance functional model without regard to the corresponding virtualization information;
  retrieving from the knowledge base both the functional information and the corresponding virtualization information for the configuration units that correspond to the virtual appliance functional model; and
  generating a virtual appliance blueprint that includes the configuration units that correspond to the virtual appliance functional model.

6. The method of claim 5 further comprising the step of generating a certified virtual appliance from the virtual appliance blueprint.

7. The method of claim 5 wherein the virtual appliance is an open virtualization appliance (OVA).

8. The method of claim 5 wherein the user specifies the functional information in the user interface by making a plurality of selections in the user interface.

9. The method of claim 5 wherein the method is performed as part of a web-based service that includes performing the method to an online user in exchange for payment.

10. An article of manufacture comprising software stored on a non-transitory computer readable storage medium, the software comprising:
 a virtual appliance construction tool that provides a user interface that allows a user to specify functional information in the user interface corresponding to functional information stored in a plurality of configuration units in a knowledge base, each configuration unit including the functional information and corresponding virtualization information, wherein the functional information specifies software function and the corresponding virtualization information specifies metadata that describes how to package the software function within a virtual appliance, wherein the user specifies the functional information in the user interface and does not select or otherwise specify in the user interface the corresponding virtualization information, the virtual appliance construction tool generating from the user-specified functional information in the user interface a virtual appliance functional model, querying the knowledge base to determine which configuration units have functional information that corresponds to the virtual appliance functional model without regard to the corresponding virtualization information, retrieving from the knowledge base both the functional information and the corresponding virtualization information for the configuration units that correspond to the virtual appliance functional model, and generating a virtual appliance blueprint that includes the configuration units that correspond to the virtual appliance functional model.

11. The article of manufacture of claim 10 wherein a certified virtual appliance is generated from the virtual appliance blueprint.

12. The article of manufacture of claim 10 wherein the virtual appliance is an open virtualization appliance (OVA).

13. The article of manufacture of claim 10 wherein the user specifies the functional information in the user interface by making a plurality of selections in the user interface.

* * * * *